Patented Sept. 8, 1925.

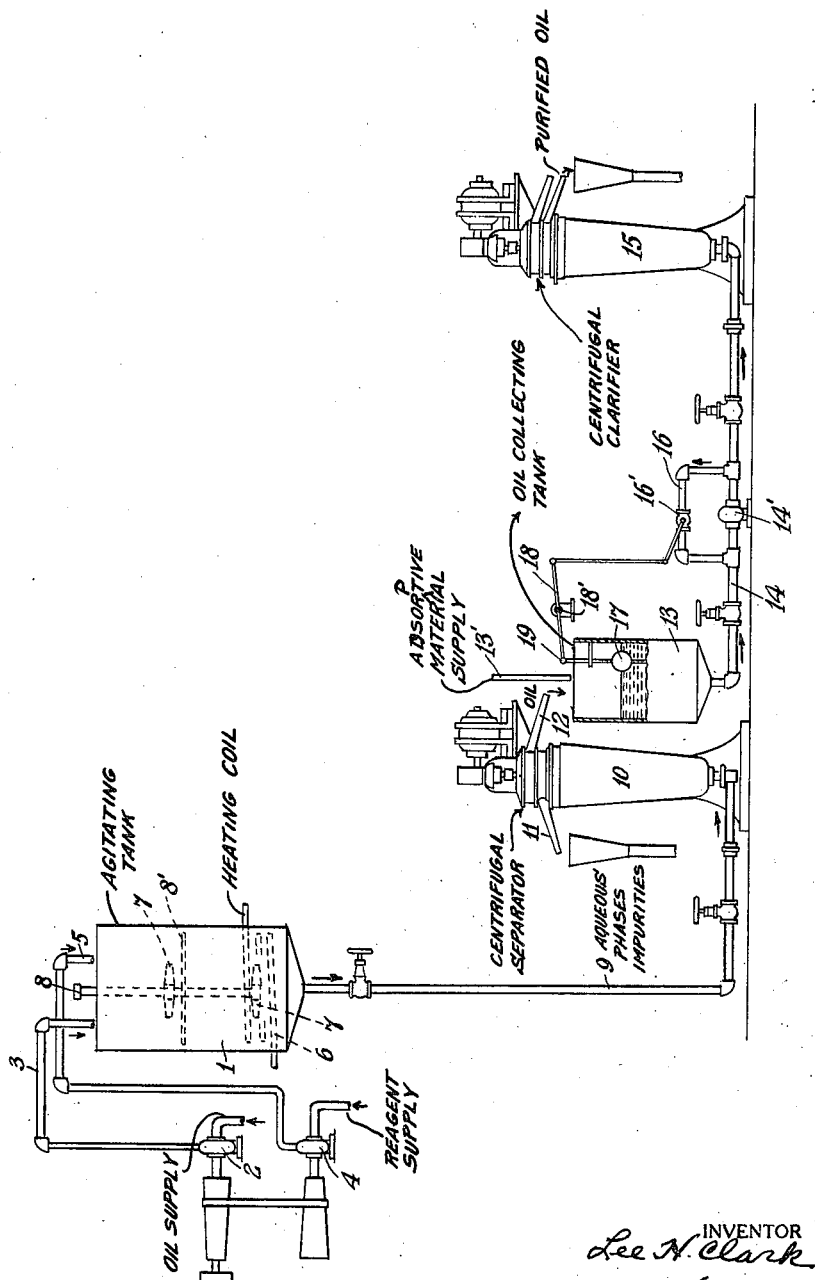

1,553,141

UNITED STATES PATENT OFFICE.

LEE H. CLARK, OF ROSEMONT, PENNSYLVANIA, ASSIGNOR TO THE SHARPLES SPECIALTY COMPANY, OF PHILADELPHIA, PENNSYLVANIA, A CORPORATION OF DELAWARE.

OIL PURIFICATION.

Application filed November 29, 1924. Serial No. 752,874.

*To all whom it may concern:*

Be it known that I, LEE H. CLARK, a citizen of the United States, residing in Rosemont, county of Montgomery, and State of Pennsylvania, have invented new and useful Improvements in Oil Purification, of which the following is a specification.

My invention relates to the purification of oil, an important application and embodiment thereof being a method and apparatus for the purification or restoration or renovation of oils that are rendered impure by the presence within them, either naturally or by reason of or during the use to which they have been put, of decomposition products, free fatty acids, and colloidally suspended substances or one or more of such or other impurities.

An object of my invention is to provide a method and apparatus whereby oil may be prepared or restored or renovated and so brought to a condition wherein it is well adapted to a particular use.

Examples of oils in which impurities have been produced by reason of or during their use and which may be purified in accordance with my invention are oils that have been used to immerse electric switches, circuit breakers and transformer coils in which carbon in colloidal form has been produced during their normal use and which may also contain water, soaps of heavy metals, decomposition products, and other impurities, and the acidity of which is increased during their use. Another example of such oil are oils that have been used for the lubrication of internal combustion engines and contain suspended carbon, organic acids, other decomposition products and other impurities.

A further but important object of the purification that is to be accomplished by the use and practice of my invention is the removal of impurities that lessen the resistance of the oil to emulsification. The complete purification or renovation or restoration of oil that is to be used to immerse circuit breakers in electric circuits of high potential will ordinarily involve the removal of the impurities above mentioned and also such impurities as lessen the resistance of the oil to emulsification. However, it may be desirable in some cases to merely remove the impurities previously mentioned without regard to the ultimate ability of the oil to resist emulsification.

Other oils than those specifically mentioned and into which similar impurities have been introduced by reason of or during the use to which the oils have been put, or otherwise, may be purified or restored in accordance with my invention, and although purification of oil in accordance with my invention may neutralize or otherwise remove the acidity of the oil such removal of acidity is incidental to the process, and my invention is not to be confused with the mere neutralization of sour oils that are produced in the course of acid purification.

Other and further objects of my invention will appear from the following description.

In purifying, in accordance with my invention, oil that contains or in which one or more of the above mentioned impurities have been produced during the use thereof, the oil is treated with an aqueous solution or reagent that has the property of being dispersed more easily than pure water throughout the oil and the property of causing impurities to be removed from the oil as by passing into the aqueous phase of the mixture that comprises oil and dispersed aqueous reagent or by being put into a state wherein their removal may be effected by treatment in accordance with my invention. A dispersion of such reagent throughout the oil may be advantageously effected by agitation of sufficient violence and duration to cause the aqueous reagent or phase to be carried to all parts of the mixture in small particles or globules in order that some of the aqueous reagent or phase will lie closely adjacent to but not necessarily in contact with every part of the oil that is to be purified. The mixture is advantageously maintained in a heated state during agitation by heating one or both of the constituents thereof prior to their admixture or by heating the mixture or by any one or more of such expedients. The temperature to which the mixture is brought is dependent upon the viscosity of the oil that is being treated and should be sufficient to insure that agitation will produce such dispersion of the reagent within the oil as will bring it into close relation with the impurities, and sufficient to render effective the subsequent treatment, for example, treatment in centrifugal machines. The aqueous reagent should be sufficient in quantity and strength to satisfy the affinities of the impurities in the oil and still provide a sufficient excess of active reagent to insure that the reagent will be properly dispersed throughout the oil and will cause the impurities to be removed from the oil as by passing into the aqueous phase of the resulting mixture. The relative quantity of aqueous solution or reagent or phase that is agitated with the oil to be purified may vary in the treatment of different oils and oils containing different impurities as hereinafter more fully set forth. The mixing of oil and the aqueous reagent that provides the aqueous phase of the resulting mixture may be carried on continuously or the mixture may be produced in batches.

After the aqueous reagent is properly dispersed throughout the oil to be purified such treatment of the mixture as will cause a separation therefrom of the aqueous phase thereof results in purification of the oil, impurities being carried out with the aqueous phase or put into a state in which the oil may be freed of them by treatment of the oil in accordance with my invention. In order to advance the degree of purification of the oil and also to improve its resistance to emulsification a particular reagent is employed under some circumstances and under other circumstances further treatment of the oil by means of an adsorptive material is carried out, or both measures may be employed to that end.

Purification of the oil that occurs in the course of the separation of the aqueous phase from the mixture can be effected advantageously by the use of centrifugal devices although purification of the oil by means of centrifugal devices can not be effected without previous treatment of the oil in accordance with my invention.

The aqueous reagent or aqueous phase of the mixture that is formed with the oil may be prepared by dissolving in water substances that impart to the reagent the property of dispersing more easily than pure water throughout the oil and render it effective to separate impurities therefrom. Such substances include alkaline substances such as caustic soda, soda ash, tri-sodium phosphate and other alkaline substances that produce the desired effects while in solution. If the reagent is prepared from an alkaline substance the degree of alkalinity of the reagent must be such as to render the reagent capable of being more easily dispersed in the oil than is pure water and capable of causing removal of the impurities therefrom. However, excessive alkalinity of the resulting mixture is to be avoided because of the danger of preventing soaps already present in the oil or that may be formed with the fatty acid present from dissolving in the aqueous phase and thereby rendering the oil subject to emulsification, sludging, etc. In the practice of my invention in connection with the purification of impure oils containing finely divided carbon, some of which may be in colloidal form, such as switch oil and transformer oil and lubricating oil of internal combustion engines, I have successfully employed a reagent having an available, though not in every case initially free, alkalinity equivalent to the alkalinity of a solution containing $\frac{1}{4}\%$ to $1\%$ by weight of caustic soda, a solution having an alkalinity equivalent to such a $\frac{1}{2}\%$ solution of caustic soda having been found generally applicable and convenient for commercial work.

I have found that in the purification of oil in accordance with my invention advantage may be gained by the use of a reagent of which at least some part of the substance present is in colloidal suspension or solution. An effective solution of such character may be produced by the use of sodium silicate, particularly sodium silicate in which silica predominates by weight, for example, in which there are 3.25 parts by weight of $SiO_2$ to each part of $Na_2O$, or sodium aluminate or any reagent that gives sufficient alkaline concentration and in addition gives naturally, or can be made to give by combination with other agents, the required colloidal conditions. The required colloidal condition is attainable by introducing into the reagent very finely divided silica which is a crystalline substance in its dry state, or by introducing into or producing in the reagent an extremely soft and gelatine-like colloid such as aluminum hydroxide, the colloid produced by sodium silicate being relatively firm as compared with aluminum hydroxide. It is possible, though I do not desire to be bound by such theory, that the colloidal substance enmeshes solid or semi-solid or colloidal impurities, including carbon particles that have been wetted by the solution, but which by reason of attached oil have a specific gravity between that of oil and water, and causes them to separate readily from the oil. I have found that by the use of a colloidal reagent the layer of sludge that ordinarily forms between the oil and the murky alkaline water does not occur but on the contrary there is produced a sharp line of separation between the oil and murky water and the solids or semi-solids that otherwise form a sludge line between the oil and water will sink in the water. Recovery of pure oil is facilitated by causing the impurities that would otherwise float at the interface between the oil and aqueous phase to sink in the aqueous phase.

Treatment of impure oil with a reagent of the character and in the manner above described makes it possible to effect recovery of the oil by means of a centrifugal separator, the separator bowl of which may, for example, be of the type shown in the Sharples Patent No. 1,320,419, from which the oil and the more or less contaminated water may be separately discharged. If the oil that is discharged from the centrifugal separator appears to have been sufficiently purified so that by further treatment, in accordance with my invention as herein described, it is rendered suitable for re-use, it indicates that the proportion of water in the emulsion has been correct and that the alkaline concentration has been correct, but if the oil does not appear to be sufficiently purified this is an indication that the conditions of the aqueous phase of the emulsion were incorrect for the particular oil treated. Thus, if the oil appears to be insufficiently purified and the aqueous discharge from the centrifugal separator is turbid but light in shade the degree of alkalinity of the aqueous alkaline reagent used was insufficient to effect a substantial removal of the impurities, e. g. colloidal carbon, contained in the oil being treated. On the other hand if the aqueous discharge from the centrifugal separator contains a high concentration of removed impurities and the oil appears to have been insufficiently purified this indicates that the mixture produced by the agitation contained an insufficient proportion of the aqueous phase.

If, in the treatment so far described, a reagent including a colloidal component has been used, it will be found that the resistance of the oil to emulsibility has been improved if the resistance to emulsibility of the original impure oil was very unsatisfactory.

In order to make as full a disclosure of my invention as possible but with the express understanding that I am not bound thereby it is my belief that the removal of impurities in accordance with my invention is effected by electric action. The aqueous solution or reagent or phase contains a substance that imparts to it the property of widely and easily dispersing within the oil, perhaps as discontinuous particles, the oil being continuous, and it is my present belief that the reagent so dispersed contains and carries throughout the oil negative charges adsorbed at the oil-water interface and that impurities including carbon particles being positively charged are thereby attracted to and caused to concentrate at that interface and that the positive charges are neutralized and flocculation of the impurities occurs and the preferential wetting of carbon by the aqueous phase permits as well as causes the carbon particles to pass into the aqueous phase. In other words the negative charges carried throughout the oil by the aqueous phase cause impurities to pass to and into the aqueous phase whereby they are removed by it or such charges otherwise put the impurities into such state that they may pass out with the aqueous phase particularly when that phase is separated from the mixture by means of a centrifugal device. The mere ability of a substance to wet the carbon particles is apparently not sufficient to cause them to pass readily into the aqueous phase and it is apparently essential to the attainment of a high degree of purification that the aqueous phase contain a substance that will attract to itself from the oil electrically charged impurities of the oil. A substance that merely wets the carbon particles must be brought into actual contact with each carbon particle before such wetting can occur. With the substances that I describe the particles will migrate to the dispersed reagent because of the opposite charges present. My belief that this theory explains the effectiveness of my invention is supported by the fact that a soap solution is known to wet carbon but to remove carbon particles from oil it is necessary mechanically to bring such soap solution into actual contact with each individual particle whereas the substances employed in accordance with my invention need only be sufficiently dispersed within the oil to permit the impurities of the oil to be drawn within them as by being caused to concentrate at the interface and to be subsequently preferentially wetted. In substantiation of the fact that electrically charged impurities of the oil are attracted to globules of a reagent that produce an opposite charge at the interface between the reagent and the oil, it has been demonstrated that finely divided carbon particles existing as an impurity in oil are positively charged and it is well known that globules of aqueous reagent dispersed in oil are rendered negative at the oil-water interface by the presence in the globules of hydroxyl ions that are due to or freed within the reagent by the presence in the reagent of an alkaline or other substance that will produce in water free hydroxyl ions.

If treatment of the impure oil by the steps so far described has not satisfactorily purified the oil or rendered its resistance to emulsification satisfactory, fuller's earth or other decolorizing clays or any similarly adsorptive material may be added to the oil at this stage. I have found that in treating oil at this stage by the use of such adsorptive material only an amount of the order of one quarter of one percent need be added whereas I have found it impossible to obtain sufficient purification by the use of even very large amounts of adsorptive material if the alkaline treatment of the oil is omitted. Treatment in accordance with my invention puts the oil in such condition that very small amounts of adsorptive material will enhance the purity thereof and effect that purification or alteration of the oil whereby its resistance to emulsification is made satisfactory. It is possible that treatment by caustic soda or other non-colloidal reagents will not improve the resistance to emulsification of oils that were not originally particularly bad in that respect but the resistance to emulsification of such oils may be made entirely satisfactory by the use of such small amounts of adsorptive material. If the original impure oil is very poor in respect to its resistance to emulsification, its resistance to emulsification is improved by the use of a reagent containing a colloidal component and made entirely satisfactory by further treatment with such small percentage of adsorptive material; and such small percentage of adsorptive material will make fairly satisfactory the resistance of oil of poor resistance to emulsification that has been treated with a non-colloidal alkaline reagent.

At this stage oil that has been mixed with a suitable reagent and from which the aqueous phase of such mixture has been removed, preferably by a centrifugal separator, is now advantageously treated in a centrifugal clarifier regardless of whether or not it has been treated in the meantime by any adsorptive material. Such treatment will remove any residual water as well as other impurities and will, if adsorptive material has been added, remove that material together with impurities that have been adsorbed by it. In the treatment of certain oils the quality of the oil discharged from the clarifier may be improved by delaying its introduction into the clarifier after it has been discharged from a centrifugal separator. The adsorptive material may be introduced in any manner so long as it is introduced in a uniform proportion.

In accordance with my invention oils contaminated as above described may be purified and put into condition for re-use for the purposes in which they became contaminated, although the contaminating impurities therein are of such a character that the oils cannot be practicably purified by methods heretofore known, e. g. by the use of previously known centrifugal processes or filtering devices such as blotter filters, and if desired the resistance of the oil to emulsification may be improved by selection of the aqueous reagent used or by treatment with an adsorptive medium after treatment with a suitable aqueous reagent or by both of these treatments.

In accordance with my invention the necessary properties of the oil may be restored so that it may be used again in the same manner and for the same purposes in which it became contaminated, the cost of such restoration being but a small percentage of the value of the oil.

As a specific example of the purification of oil in accordance with my invention, I herein describe the purification of oil that has been used to immerse electric circuit breakers or switches, with the understanding, however, that my invention is not limited to that specific application.

Oil that had been so used and that had a viscosity of 100 seconds Saybolt universal viscosity at 100° F. and which contained a substantial proportion of suspended colloidal carbon, moisture, and other impurities and which could not be purified or restored practicably by processes heretofore known, e. g., filtration through blotting paper, or ordinary centrifugal treatment, was mixed with an aqueous solution of caustic soda, nine parts of contaminated oil being mixed with one part of aqueous alkaline agent, the aqueous alkaline agent containing one half of one percent of caustic soda. And, similar oil was treated by an aqueous solution of sodium silicate of which the proportions of $Na_2O$ and $SiO_2$ were as above set forth in which the sodium silicate amounted to 2% by weight of the aqueous solution or reagent. In each case the mixture was maintained at a temperature of 170° F. and violently mechanically agitated for about three minutes. This agitation produced a turbid emulsion, and the mixture so produced was flowed through the bowl of a centrifugal separator, generally of the type above mentioned, the agitation of the emulsion being continued and the temperature thereof being maintained during the time that it was flowing to the centrifugal bowl. The aqueous discharge from the centrifugal separator consisting of the aqueous phase of the mixture was turbid and had a grayish appearance. The oil discharged from the centrifugal separator contained traces of moisture and other unremoved impurities. The mixture was passed into the centrifugal separator at the rate of about 165 gallons per hour, the bowl being 4⅛" inside diameter and 30" long and being rotated at 15,000 R. P. M. 35 gallons of oil discharged from the centrifugal separator were allowed to accumulate. The accumulated oil had a temperature of about 160° F. and was flowed through a centrifugal clarifier at the same rate at which it was discharging from the centrifugal separator. The oil discharged from the clarifier and which had first been treated with caustic soda was substantially free of moisture, colloidal carbon and other impurities, was light in color. The samples of oil that were treated with sodium silicate were purified in the respects above specified and it appeared that there was an advantage gained in using such colloidal reagent.

With samples of switch oil that were very poor in respect to their resistance to emulsification treatment with sodium silicate in the manner above described greatly improved their resistance to emulsification. Samples of switch oil having fair resistance to emulsification that had been treated with caustic soda as well as samples of oil having poor resistance to emulsification that had been treated with sodium silicate were treated with fuller's earth by adding one quarter of one per cent by weight of fuller's earth that had previously been mixed with oil to assist in dispersing it through the oil to be treated. The fuller's earth was added to the oil after it had passed through the centrifugal separator and the oil was then passed through a clarifier which removed the fuller's earth and any traces of moisture and other impurities that were in the oil after it passed through the separator. The oil discharged from the clarifier was substantially free of moisture, colloidal carbon and other impurities, was light in color and had an entirely satisfactory resistance to emulsification and was ready for re-use.

I have found that treatment of such impure oil in the manner above described makes it possible to employ centrifugal machines in the purification thereof but I do not intend that my invention shall be limited to the use of centrifugal machines as my invention embraces the purification of such impure oil by the use of the reagents and materials and steps above specified regardless of what devices are employed to effect the separations that are effected in the separator and clarifier in the example above described.

If the oil treated in accordance with my invention is of such a character that the oil discharged from the centrifugal separator possesses the properties that are desirable in connection with the particular use that is to be made of the oil it is apparent that the clarifier need not be used. While certain oils contaminated as above described may be so handled during their treatment in the centrifugal separator that the oil discharged from such separator is sufficiently purified to be re-used without further treatment, other oils contaminated as above described may require, particularly after treatment with an adsorptive material, further treatment, as in a centrifugal clarifier, in accordance with my invention as herein described. And, furthermore, economical advantages are derived from the use, in accordance with my invention of a clarifier to further the purification of oil discharged from the separator. Thus, under certain conditions, an attempt to produce the desired degree of purification of the oil without using a clarifier would tend toward an inefficient utilization of the separator as by requiring a disadvantageously reduced capacity thereof, whereas operation of the separator at usual or rated capacity will purify the oil to a sufficient extent to make it possible to restore the oil to a condition in which it is suitable for re-use by passing it through a clarifier in accordance with my invention.

In order to assist in the understanding of my invention but with the understanding that my invention is not limited thereto I describe herein and show in the drawings accompanying this specification apparatus whereby the process above specifically described may be carried out.

In the single figure of the drawings I have shown diagrammatically one form of apparatus whereby one application of my invention may be practised.

In the drawings the agitating tank 1 may be continuously or intermittently fed with the oil that is to be purified by means of the pump 2 and the feed pipe 3, and it may be similarly fed with an aqueous alkaline reagent, for example, caustic soda, by means of the pump 4 and feed pipe 5. When the proportion of aqueous alkaline reagent to oil has been determined the pumps 2 and 4 may be connected for simultaneous operation to produce a continuous or intermittent supply of oil and alkaline in the desired proportions. If the oil and aqueous alkaline has not been previously heated the mixture thereof may be heated in the agitating tank 1 by a steam or electric coil 6 and the mixture may be agitated in any manner, for example, by means of the agitating wheels 7 that are driven in any desired way by means of the shaft 8 and which may advantageously lie on opposite sides of the baffle plate 8'. The agitator is driven at sufficient speed to produce agitation sufficiently violent to bring the aqueous alkaline into contact with the impurities of the oil or into proximity therewith. While the mixture is maintained at the desired temperature and the agitation is preferably being continued the resulting mixture is led by the pipe 9 to the centrifugal separator 10 and the aqueous phase of the mixture is dicharged through the spout 11 and contains impurities of the oil being purified. Oil is discharged from the centrifugal separator 10 through the spout 12 into the receiving tank 13 from which it is passed through pipe 14 by means of the pump 14' to the centrifugal clarifier 15 from which it is discharged in a condition in which it may be re-used. The fuller's earth or other adsorptive material is added to the oil before it is introduced into the clarifier as by introducing it into the oil in the tank 13 by any suitable device such as the pipe 13'. If it is desired to delay the introduction to the clarifier 15 of the oil discharged from the separator 10 the pipe 14 may be provided with a by-pass 16 around the pump 14' and having a valve 16' controlled by a float 17 in the receiving tank 13 in any appropriate manner, for example, by means of the lever 18 pivoted at 18'. By adjustment of the position of the float 17, for example, by screwing it up or down upon the guided rod 19 on which it is threaded, the amount of oil that must be in the tank 13 before any oil will flow to the clarifier 15 may be regulated. It will be apparent that the valve 9' in the pipe leading to the centrifugal separator may readily be controlled in connection with the valve 16' in order to properly regulate the rate of flow of the mixture through the apparatus employed.

From the foregoing it will be apparent that I herein describe a process and apparatus whereby it is possible to remove from oil impurities that are difficult to remove and whereby such purification of oil as may be effected by the use of alkaline reagents can be carried out and whereby the oil containing one or more of the impurities above mentioned may be sufficiently purified to render it capable of being re-used, and whereby the resistance of oil to emulsification may be made satisfactory.

I am aware that it has been proposed to purify some oils, but not oils containing finely divided carbon, by substances or solutions that are strongly alkaline and which produce a precipitation of products of saponification. However, such precipitates are in themselves partly soluble in the oil and an impurity is thereby introduced. And, as it is not practicable to separate them from the oil by centrifugal force, particles of such products are left in the oil after centrifugal treatment and those particles carry into the oil such impurities as finely divided carbon. Entry of finely divided carbon into the aqueous phase is hindered by the formation of a sludge layer composed of such precipitates and by high specific gravity of the alkaline solution, particularly when such particles are not well freed of oil. In the practice of my process the aqueous reagent will be sufficiently dilute that water soluble impurities in the oil and products of saponification present or produced, and other products of any reaction between the reagent and the oil or its impurities, will all be in solution in the aqueous phase of the resulting mixture. Thus, after treatment of the oil in accordance with my invention with an aqueous reagent, the mixture will include oil, that may be dried and that may have its resistance to emulsification improved, and an aqueous phase containing impurities or products thereof that are in solution and a sediment composed of dirt, metallic particles, carbon particles and any silica coming from the reagent. Gravity settling of such a mixture will not produce between the oil and the aqueous phase a layer of sludge containing products of saponification as in processes heretofore suggested. It is because all impurities or products thereof, that are soluble, are in solution, that it is possible to effect a centrifugal separation of the aqueous phase and sediment from the oil.

While I have described my invention in detail and have referred to specific applications thereof I do not intend that my invention shall be limited to such details or to such specific applications but intend that it shall be defined by the hereunto appended claims.

What I claim and desire to secure by Letters Patent is:

1. The method of purifying impure oil that contains finely divided carbon which comprises dispersing throughout the oil an aqueous alkaline reagent sufficiently dilute that water soluble impurities and water soluble products of any reaction produced by the reagent will be in solution in the aqueous phase of the resulting mixture, and centrifugally separating the aqueous phase from the oil.

2. The method of purifying impure oil that contains finely divided carbon which comprises dispersing throughout the oil an aqueous alkaline reagent sufficiently dilute that water soluble impurities and products of saponification present will be in solution in the aqueous phase of the resulting mixture, and separating the aqueous phase and impurities from the oil.

3. The method of purifying impure oil that contains finely divided carbon which comprises dispersing throughout the oil an aqueous alkaline reagent sufficiently dilute that water soluble impurities and products of saponification present will be in solution in the aqueous phase of the resulting mixture, and centrifugally separating the aqueous phase and impurities from the oil.

4. The method of purifying impure oil that contains finely divided carbon which comprises dispersing throughout the oil an aqueous alkaline reagent sufficiently dilute that water soluble impurities and water soluble products of any reaction produced by the reagent will be in solution in the aqueous phase of the resulting mixture, centrifugally separating the aqueous phase from the oil, and treating the recovered oil with adsorptive material.

5. The method of purifying impure oil that contains finely divided carbon which comprises dispersing throughout the oil an aqueous alkaline reagent sufficiently dilute that water soluble impurities and water soluble products of any reaction produced by the reagent will be in solution in the aqueous phase of the resulting mixture, centrifugally separating the aqueous phase from the oil, and treating the recovered oil with not more than one percent of adsorptive material.

6. The method of purifying impure oil that contains finely divided carbon which comprises dispersing throughout the oil an aqueous alkaline reagent, separating the aqueous phase of the resulting mixture from the oil, and treating the recovered oil with not more than one percent of adsorptive material and thereby increasing the resistance of the oil to emulsification with water.

7. The method of purifying impure oil that contains finely divided carbon which comprises dispersing throughout the oil an aqueous alkaline reagent sufficiently dilute that water soluble impurities and water soluble products of any reaction produced by the reagent will be in solution in the aqueous phase of the resulting mixture, centrifugally separating the aqueous phase of the resulting mixture from the oil, agitating the recovered oil with not more than one percent of adsorptive material, and separating the adsorptive material from the oil.

8. The method of purifying impure oil that contains finely divided carbon which comprises dispersing throughout the oil an aqueous alkaline reagent sufficiently dilute that water soluble impurities and water soluble products of any reaction produced by the reagent will be in solution in the aqueous phase of the resulting mixture and containing a colloidal substance in suspension capable of causing the carbon to lie within the aqueous phase, and separating the aqueous phase and impurities from the oil.

9. The method of purifying impure oil containing finely divided carbon which comprises dispersing throughout the oil an aqueous alkaline reagent capable of being easily dispersed within the oil and having the property of facilitating the passage of carbonaceous impurities from the oil into the aqueous phase of the resulting mixture and containing in suspension a colloidal substance capable of causing the carbon to lie within the aqueous phase, and separating the aqueous phase from the oil.

10. The method of purifying impure oil containing finely divided carbon which comprises dispersing throughout the oil an aqueous reagent having a weak alkaline reaction capable of being easily dispersed within the oil and having the property of facilitating the passage of carbonaceous impurities from the oil into the aqueous phase of the resulting mixture, and separating the aqueous phase from the oil.

11. The method of purifying impure oil containing finely divided carbon which comprises dispersing throughout the oil an aqueous mixture having a weak alkaline reaction and having the property when in contact with the oil of attracting to it oppositely charged impurities of the oil, and separating from the oil impurities and the aqueous phase of the resulting mixture.

12. The method of purifying impure oil which comprises dispersing throughout the oil an aqueous alkaline reagent sufficiently dilute that water soluble impurities and water soluble products of any reaction produced by the reagent will be in solution in the aqueous phase of the resulting mixture, and separating the aqueous phase from the oil.

13. The method of purifying switch oil rendered impure through use which comprises dispersing throughout the oil an aqueous alkaline reagent sufficiently dilute that water soluble impurities and water soluble products of any reaction produced by the reagent will be in solution in the aqueous phase of the resulting mixture, and separating the aqueous phase from the oil.

14. The method of purifying impure oil that contains finely divided carbon which comprises dispersing throughout the oil an aqueous alkaline reagent sufficiently dilute that water soluble impurities and water soluble products of any reaction produced by the reagent will be in solution in the aqueous phase of the resulting mixture, separating the aqueous phase of the resulting mixture from the oil, agitating the recovered oil with not more than one percent of adsorptive material, and separating the adsorptive material from the oil.

15. The method of purifying impure oil that contains finely divided carbon which comprises dispersing throughout the oil an aqueous alkaline reagent having an available alkalinity equivalent to the alkalinity of a solution containing $\frac{1}{4}\%$ to $1\%$ by weight of caustic soda, and separating impurities and the aqueous phase of the mixture from the oil.

16. The method of purifying impure oil that contains finely divided carbon which comprises dispersing throughout the oil an aqueous alkaline reagent sufficiently dilute that water soluble impurities and water soluble products of any reaction produced by the reagent will be in solution in the aqueous phase of the resulting mixture, separating the aqueous phase from the oil, and centrifugally clarifying the recovered oil.

17. The method of purifying impure oil that contains finely divided carbon which comprises dispersing throughout the oil an aqueous alkaline reagent containing a colloidal compound in suspension and having an available alkalinity equivalent to the alkalinity of a solution containing $\frac{1}{4}\%$ to $1\%$ by weight of caustic soda, and separating impurities and the aqueous phase of the mixture from the oil.

18. In a method for improving the resistance of oil to emulsification the steps comprising first treating the oil with an aqueous alkaline reagent containing a compound in colloidal suspension and thereafter agitating the oil with not more than 1% of adsorptive material, and removing the adsorptive material from the oil.

19. The method of purifying impure oil that contains finely divided carbon which comprises dispersing throughout the oil an aqueous alkaline reagent having an available alkalinity equivalent to the alkalinity of a solution containing ½% by weight of caustic soda, and separating impurities and the aqueous phase of the mixture from the oil.

20. The method of purifying impure oil which comprises dispersing throughout the oil an aqueous solution containing 2% by weight of sodium silicate, and separating from the oil impurities and the aqueous phase of the resulting mixture.

21. The method of purifying impure oil which comprises dispersing throughout the oil an aqueous solution containing 2% by weight of sodium silicate having substantially the composition $Na_2O.3.25SiO_2$, and separating from the oil impurities and the aqueous phase of the resulting mixture.

22. The method of purifying impure oil containing finely divided carbon which comprises dispersing throughout the oil an aqueous reagent having a weak alkaline reaction and having the property of dissolving all products of saponification produced thereby and thereby rendering impurities including the finely divided carbon separable from the oil by centrifugal action, and centrifugally separating from the oil impurities and the aqueous phase of the resulting mixture.

In testimony whereof, I have signed my name to this specification.

LEE H. CLARK.